(12) United States Patent
Galvan (10) Patent No.: US 8,872,403 B2
(45) Date of Patent: Oct. 28, 2014

(54) ELECTRICAL SYSTEM AND METHOD FOR SUSTAINING AN EXTERNAL LOAD

(76) Inventor: Mario A. Galvan, St. Cloud, FL (US)

( * ) Notice: Subject to any disclaimer, the term of this patent is extended or adjusted under 35 U.S.C. 154(b) by 278 days.

(21) Appl. No.: 13/075,414

(22) Filed: Mar. 30, 2011

(65) Prior Publication Data

US 2012/0146441 A1    Jun. 14, 2012

Related U.S. Application Data

(60) Provisional application No. 61/421,896, filed on Dec. 10, 2010.

(51) Int. Cl.
*H02K 47/20*    (2006.01)
*H02K 53/00*    (2006.01)

(52) U.S. Cl.
CPC ..................... *H02K 53/00* (2013.01)
USPC ........................................ 310/113; 310/114

(58) Field of Classification Search
USPC .................................................. 310/112–115
See application file for complete search history.

(56) References Cited

U.S. PATENT DOCUMENTS

| | | | | |
|---|---|---|---|---|
| 2,376,421 A | * | 5/1945 | Drake | 322/9 |
| 4,233,858 A | * | 11/1980 | Rowlett | 475/5 |
| 4,405,028 A | | 9/1983 | Price | |
| 4,625,160 A | * | 11/1986 | Hucker | 322/32 |
| 4,967,097 A | | 10/1990 | Mehl | |
| 5,089,734 A | * | 2/1992 | Bickraj | 310/83 |
| 5,917,248 A | * | 6/1999 | Seguchi et al. | 290/31 |
| 6,157,147 A | | 12/2000 | Lin | |
| 6,239,513 B1 | | 5/2001 | Dean et al. | |
| 6,998,723 B2 | * | 2/2006 | Kong et al. | 290/1 C |
| 7,019,412 B2 | * | 3/2006 | Ruggieri et al. | 290/2 |
| 7,157,875 B2 | * | 1/2007 | Kamen et al. | 318/434 |
| 7,262,533 B2 | | 8/2007 | Fiset | |
| 7,274,124 B2 | * | 9/2007 | Fahy | 310/154.01 |
| 7,994,673 B2 | * | 8/2011 | Sorida | 310/115 |
| 2005/0173996 A1 | | 8/2005 | Ellison | |
| 2008/0054827 A1 | | 3/2008 | States et al. | |
| 2009/0079393 A1 | | 3/2009 | Teca | |

FOREIGN PATENT DOCUMENTS

WO    WO 2008/152510 A2    12/2008

* cited by examiner

*Primary Examiner* — Dang Le
(74) *Attorney, Agent, or Firm* — Terry M. Sanks; Beusse Wolter Sanks & Maire, P.A.

(57) ABSTRACT

An electrical power system capable of sustaining an electrical load, the system including at least one rechargeable battery, a charger configured to recharge the at least one rechargeable battery, an electric motor configured to receive electrical power from the at least one rechargeable battery to operate the electric motor, a generator configured to provide power for use by an external load and to the charger, the generator further including a dual core generation system with a first magnet core operating in an opposite direction of a second magnet core to increase output generated by the generator and a torque conversion system configured to connect the electric motor and the generator for rotating a magnet rotor in the generator at a rate in agreement with a rotation of the motor.

20 Claims, 9 Drawing Sheets

ELECTRICAL SYSTEM AND METHOD FOR SUSTAINING AN EXTERNAL LOAD

CROSS-REFERENCE TO RELATED APPLICATIONS

This application claims the benefit of U.S. Provisional Application No. 61/421,896 filed Dec. 10, 2010, and incorporated herein by reference in its entirety.

BACKGROUND OF THE INVENTION

Exemplary embodiments of the invention relate generally to a power supply and, more specifically, to a system and method for sustaining an external load with minimum external power.

With the continued rise in cost of fuel or energy sources, a need for more affordable fuel or energy sources is desired. Some more affordable fuel sources, such as solar power and wind power, have several built-in limitations. For example, both solar power and wind power require physical space for solar arrays or wind turbines. Thus, an individual residing in a home, condominium, or apartment may be limited on an ability to use such power sources. Another emerging power source is nuclear. However, nuclear power is not a technology that is readily available to an individual as only electric companies have an ability to satisfy government regulations to produce a nuclear power plant. Further, individuals would not require a power plant, but just a simple unit that could be used individually.

Thus, in view of the limitations recognized with other power sources, individuals would benefit from having an ability to provide sustainable power to a load while minimizing an amount of external power needed to sustain the load.

BRIEF DESCRIPTION OF THE INVENTION

Exemplary embodiments of the invention are directed to a system, specifically an electrical system, and a method for sustaining an external load. The system comprises at least one rechargeable battery, a charger configured to recharge the at least one rechargeable battery, and an electric motor configured to receive electrical power from the at least one rechargeable battery to operate the electric motor. The system further comprises a generator configured to provide power for use by an external load and to the charger, the generator further comprising a dual core generation system with a first magnet core operating in an opposite direction of a second magnet core to increase output generated by the generator. The system further comprises a torque conversion system configured to connect the electric motor and the generator for rotating a magnet rotor in the generator at a rate in agreement with a rotation of the motor.

The method comprises powering a motor with at least one battery, converting power from the motor for use by a generator comprising a dual core generation system, operating the dual core generation system to have a first magnet core operating in an opposite direction of a second magnet core to increase output generated by the generator, transmitting power generated by the generator to an external load, and transmitting power generated by the generator to recharge the at least one battery.

DETAILED DESCRIPTION OF THE INVENTION

Reference will now be made in detail to the embodiments consistent with the invention, examples of which are illustrated in the accompanying drawings. Wherever possible, the same reference numerals used throughout the drawings refer to the same or like parts. The scope of the invention disclosed is applicable to a plurality of uses, a few of which are disclosed below.

Figure 1:
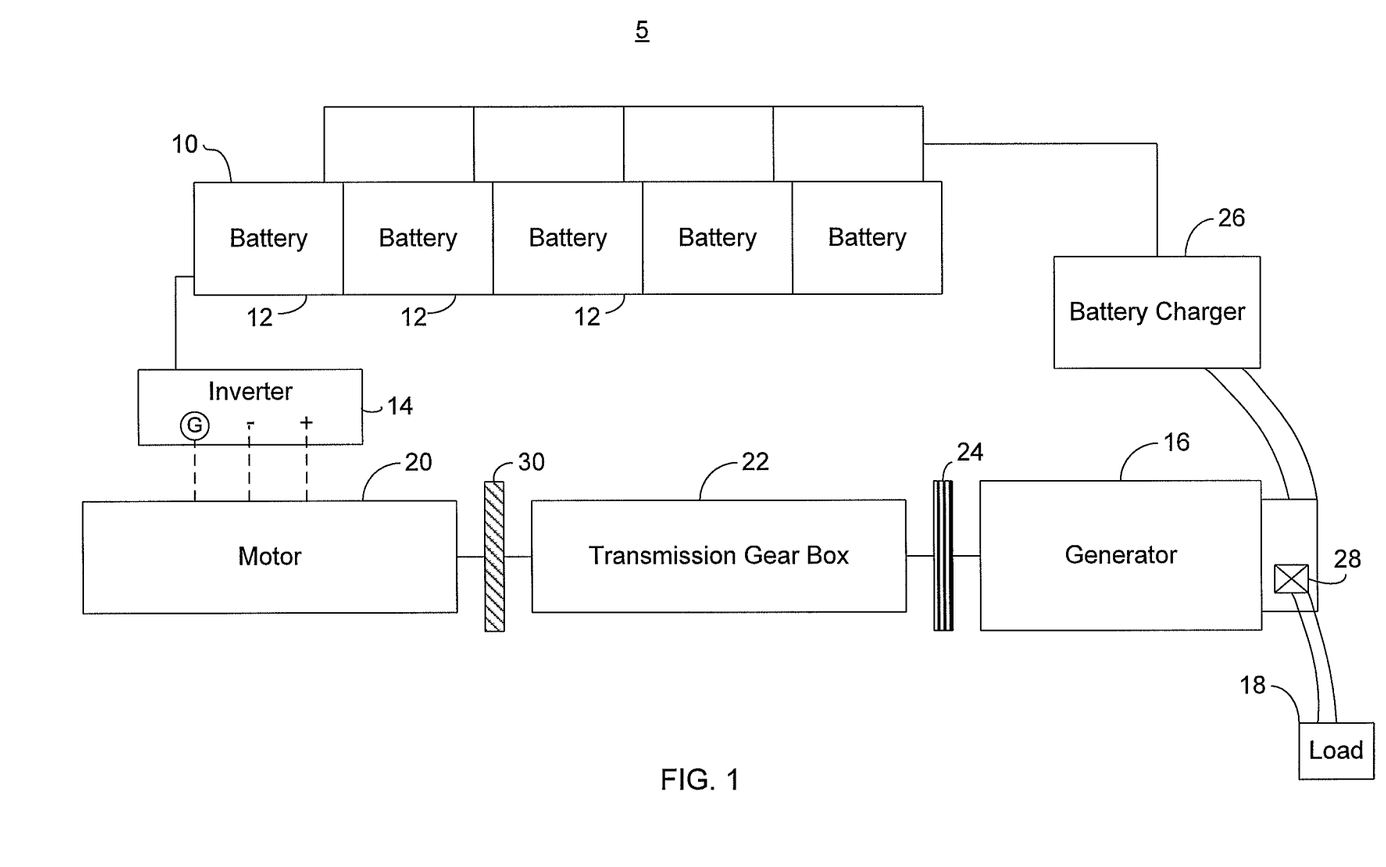
FIG. 1 discloses a block diagram of a self-generating electrical power system capable of sustaining a load.

FIG. 1 discloses a block diagram of a self generating electrical power system 5 capable of sustaining a load. As illustrated, a bank 10 of rechargeable batteries 12 is provided, though depending on the battery technology and the function of the system 5, only one battery 12 may be used. The type of battery 12 is not limiting. For example, the battery may be lithium ion cells or a twelve (12) volt battery 12. The batteries 12 provide power to an inverter 14. The batteries 12 are primarily used to start the system 5, more specifically, the generator 16, and also to provide additional power, such as a boost, if additional power is needed for peak performance by the system 5 or a load 18 connected to the system 5. The inverter 14 converts power from the batteries 12 for use by a motor 20, such as an electric motor. The motor 20 turns a torque conversion system 22. For example, the torque conversion system 22, or torque transmission system, may comprise a transmission gear box and/or chain drive which turns an inertia, torque, wheel, or weight 24. The torque conversion system 22 then operates the generator 16. The gear ratio for the torque conversion system 22 is determined by the revolutions per minute produced by the motor 20. Thus, the ratio is not necessarily a constant ratio. The generator 16 provides electrical power to a battery charger 26 to recharge the batteries 12, and includes an outlet 28 to provide electricity to the load 18, typically an external load. A cooling system 30 is also provided to cool the motor 20, namely, as to maintain the motor 20 at an acceptable operating temperature.

In more detail, an exemplary illustration of the system may include 12 volt batteries wired to the inverter 14. The inverter 14 provides power to a 120 volt electric motor 20 where the motor 20 operates at 1,740 revolutions per minute (RPM). The motor 20 turns a transmission gear box 22, or chain drive, at a 2.069 ratio which turns a torque wheel 24, which operates a 240 volt generator 16 at 3600 RPM. Power is provided to a 12 volt battery charger 26 and at least one outlet 28 is provided for use by the external load 18. The battery charger electrical output is determined by the battery amperage and the size of the motor 20.

Figure 2:
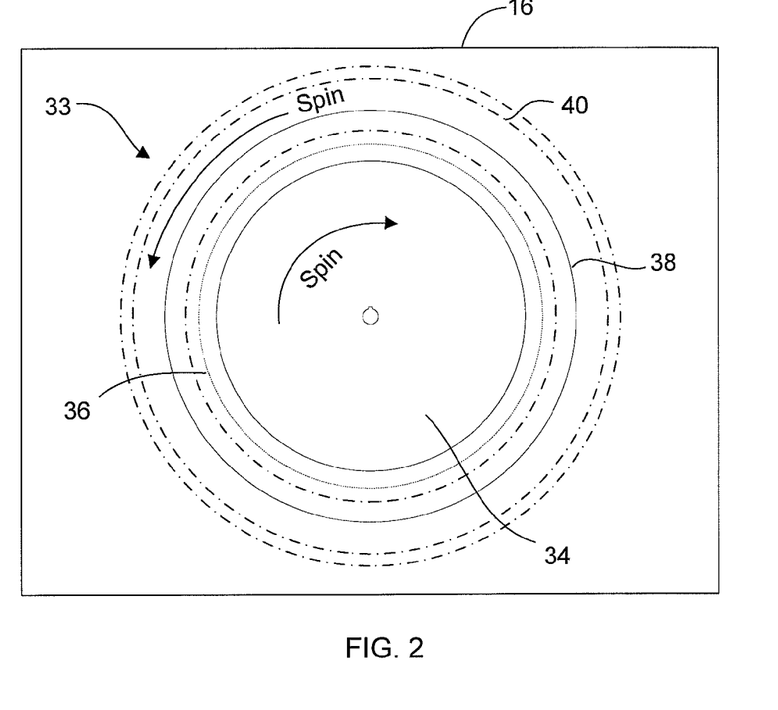
FIG. 2 discloses a diagram of an inside view of the generator depicting a dual core generator.

FIG. 2 discloses a diagram illustrating a front inside view of the generator depicting a dual core generator. The generator 16 comprises a dual core generator 33. As illustrated, a first core is located within a second core. More specifically, a first magnet rotor 34 is provided that spins in a first direction, such as clockwise. A first multi-winding stator 36 surrounds the inner magnet rotor 34. The first magnet rotor 34 and the first multi-winding stator 36 comprise the first core. A second magnet rotor 38 surrounds the first multi-winding stator 36, and spins in an opposite direction of the first magnet rotor 34, in this example, counter-clockwise. A second multi-winding stator 40 surrounds the second magnet rotor 38. The second magnet rotor 38 and the second multi-winding stator 40 comprise the second core.

Figure 3:
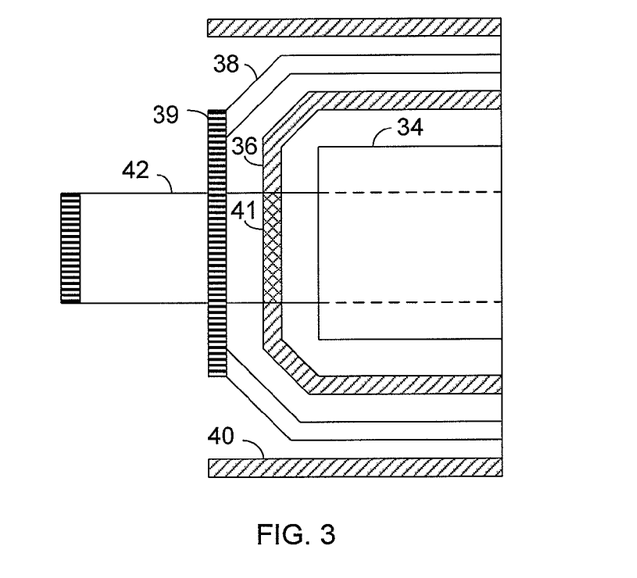
FIG. 3 discloses a side view of a front end of another exemplary embodiment of the dual core generator.

FIG. 3 discloses a side view of a front end of another exemplary embodiment of the dual core generator. The first magnet rotor 34 is on a main shaft 42, and rides on, or rotates based on, free spinning bearings 41. The second magnet rotor 38 rides on bearings with a gear/sprocket 39. The gear/sprocket 39 may be located on the front or back of the dual core generator 33. When the shaft 42 spins in one direction the rear gear/sprocket is configured to turn the second magnet rotor 38 in an opposite direction, such as with use of a chain drive (not shown). When this spin is created, the first magnet rotor 34 riding on the bearings 41 is held in place by the opposite spin of the second magnet rotor 38.

Figure 4:
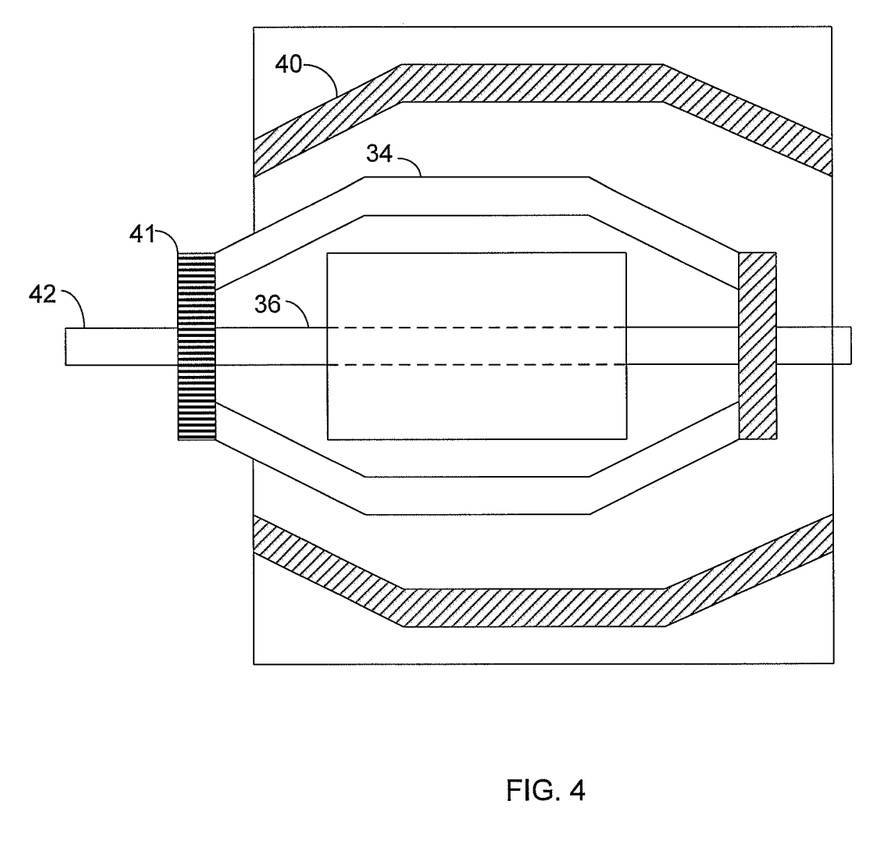
FIG. 4 discloses a side view of another embodiment of the dual core generator.

FIG. 4 discloses a side view of another embodiment of the dual core generator. As illustrated, a signal magnet 34 is located in between the first multi-winding stator 36 and the second multi-winding stator 40. The magnet 34 is connected to the shaft 42 with bearings 41. The magnet 34 rotates in between the two stators 36, 40.

In another exemplary embodiment, the first magnet rotor 34 may be configured to spin whereas the second magnet rotor 38 is configured to remain stationary. In yet other embodiment, either the first multi-winding stator 36 is configured to spin while the second multi-winding stator 40 remains stationary or the first multi-winding stator 36 remains stationary when the second multi-winding stator 40 spins. Additionally, in another exemplary embodiment, when a free riding stator is utilized, the bearings 41 may be or include a clutch mechanism, so that when clutch mechanism is configured to hold the stator stationary if operation of the generator requires it to remain stationary.

Figure 5:
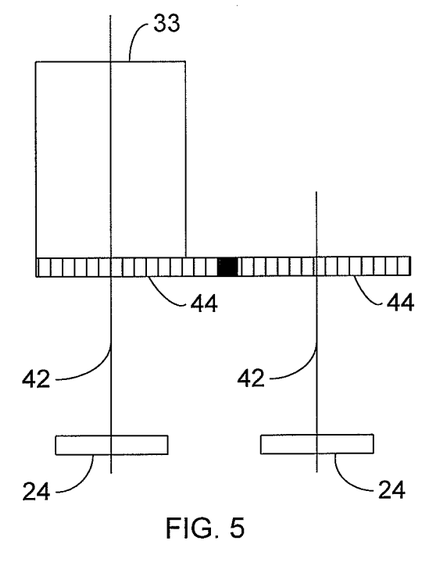
FIG. 5 discloses a top view of an internal configuration of the generator.
Figure 6:
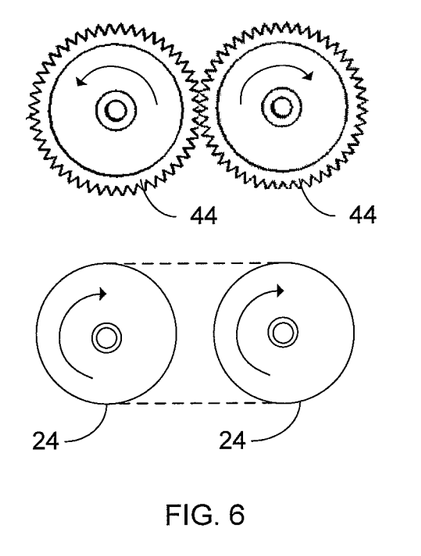
FIG. 6 discloses a front view of gears operating the generator in combination with gears from transmission gear system.

FIG. 5 discloses a top view of an exemplary embodiment of the generator 16, and FIG. 6 discloses a front view of gears operating the generator in combination with gears from transmission gear system 22. The gears 24 from the transmission gear system 22 are connected via a first shaft 42 and a second shaft 43 to a set of gears 44 in communication with the dual core generator 33. The set of gears 44 rotate in an opposite direction from each other and each respective gear 44 control the rotation a respective one of the magnet rotors 34, 38, as explained above, wherein the gear operating opposite the gears 24 is able to operate opposite because of a bearing/gear/sprocket arrangement.

In another exemplary embodiment, the first core is not surrounded by the second core of the dual core generator, but both cores are still configured with the each respective magnet rotor 34, 38 operating in an opposite direction from the other magnet rotor 34, 38. In another exemplary embodiment, the magnet rotors 34, 38 operate or spin in the same direction. However, spinning in opposite directions will result in more power being generated than when the magnet rotors 34 38 spin in the same direction.

Figure 7:
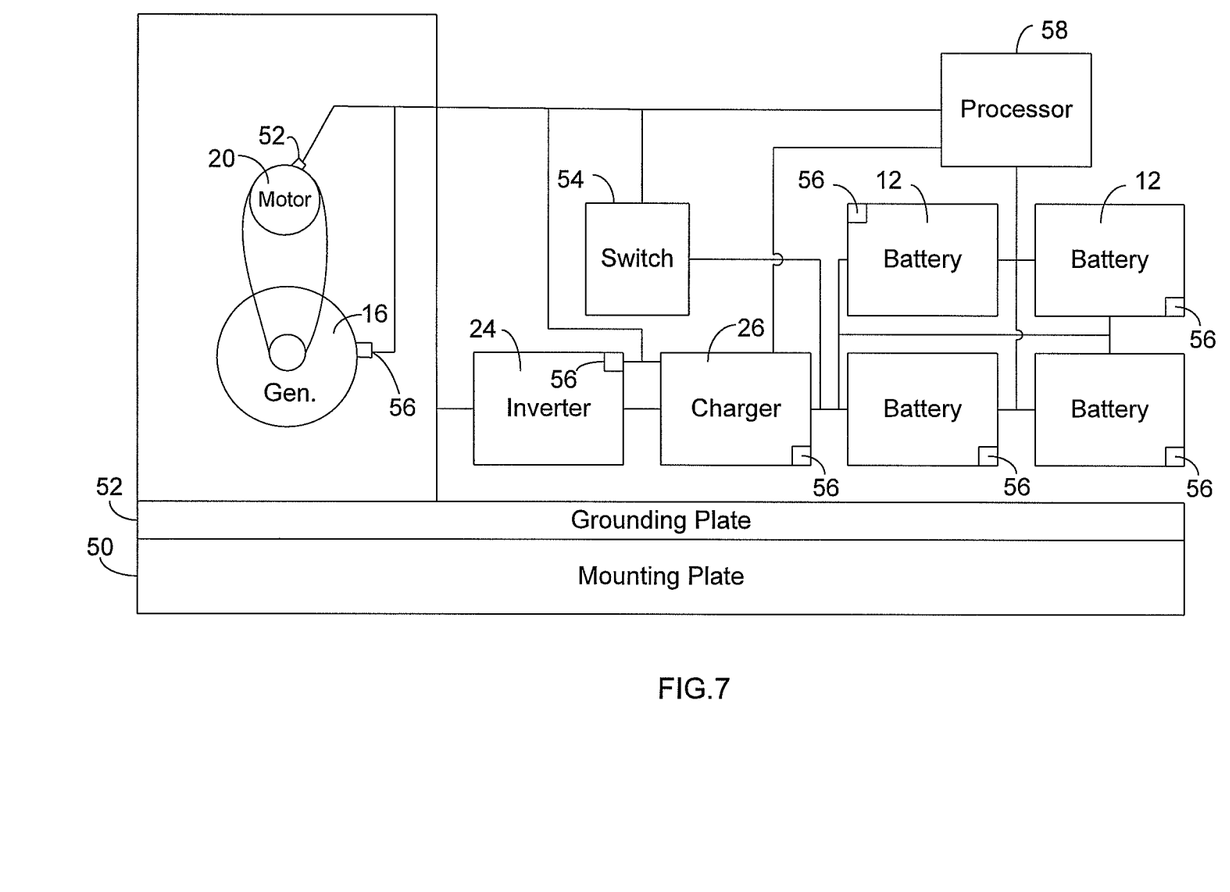
FIG. 7 discloses a block diagram of a self-generating electrical power system in a contained unit.

FIG. 7 discloses a block diagram of a generating electrical power system in a contained unit. As illustrated, all components discussed above are situated on a mounting plate 50, where the plate 50 also includes a grounding plate 52 to ground all elements. In other words, the grounding plate 52 is provided as a grounding source since the system is in a contained unit which is transportable, or movable from one location to another. Being within a contained unit, the system 5 may be moved about freely by a user to any location where the user prefers to use the system 5. Also disclosed is a switch 54, or switching device. When a plurality of batteries is used, not all batteries are necessarily required at all times. The switch 54 in conjunction with sensors 56 may be used to determine which battery 12 is used and automate switching between batteries 12 is possible to distribute the degradation of the batteries 12 across all batteries 12 more uniformly, such as by switching between which batteries are being discharged and/or discharged. The system 5 may be integrated to a processor 58 wherein a status of each battery 12 is determined based on the sensors 56, such as, but not limited to, voltage sensing sensors. The sensed voltages are provided to the processor 58 which then commands the switch 54 as to which battery 12 to include in the system 5 for producing electricity and which to exclude at a given time. In addition to regulating charging of the batteries, the processor 58 may also control the system 5. For example, if the motor 20 is operating at too high of a temperature, the processor 58 may turn off the system. Thus, sensors 56 may be provided on each element of the system 5, where information from each sensor 56 is provided to the processor 58.

Figure 8:
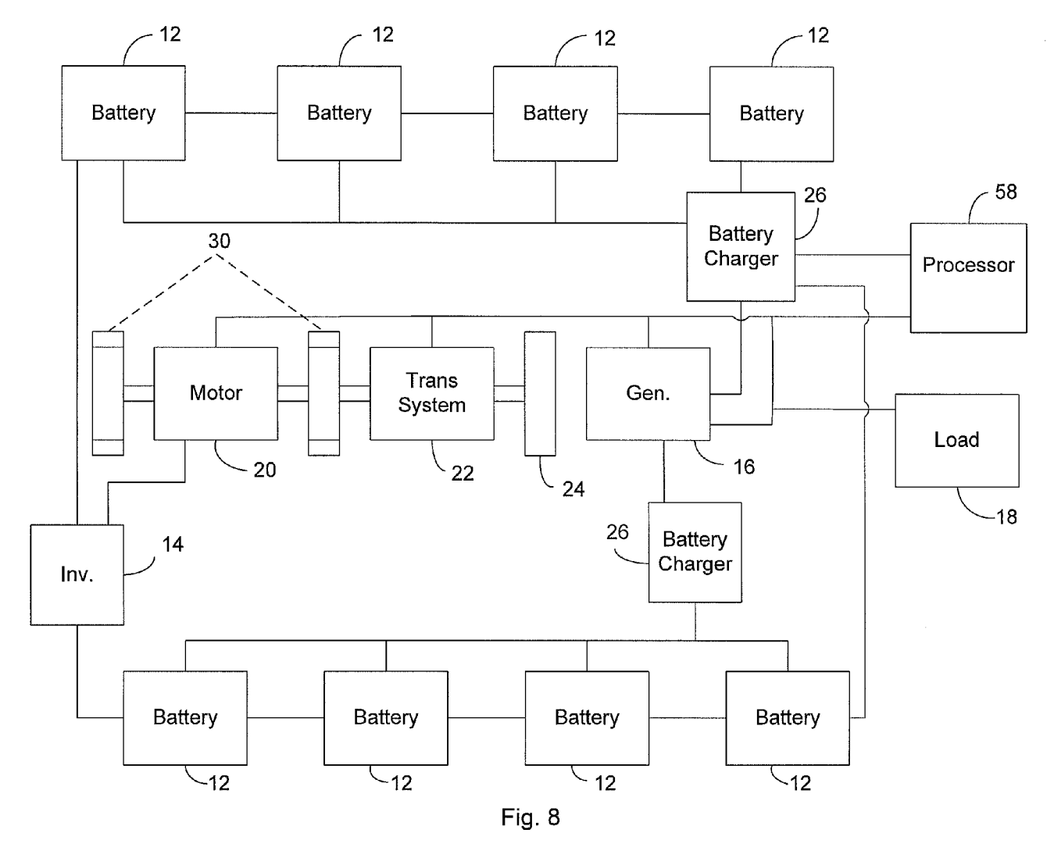
FIG. 8 discloses another block diagram of a self-generating electrical power system capable of sustaining a load.

FIG. 8 discloses another block diagram of a generating electrical power system capable of sustaining a load. As illustrated, the cooling system 30 may comprise more than one cooling fan. Furthermore, more than one battery charger 26 may be provided. For example, each battery 12 may have its own individual battery charger 26 or a defined number of batteries 12 may utilize certain battery charger 26 when more than one battery 12 is used and more than one battery charger 26 is provided, especially where the batteries 12 outnumber the battery chargers 26.

Figure 9:
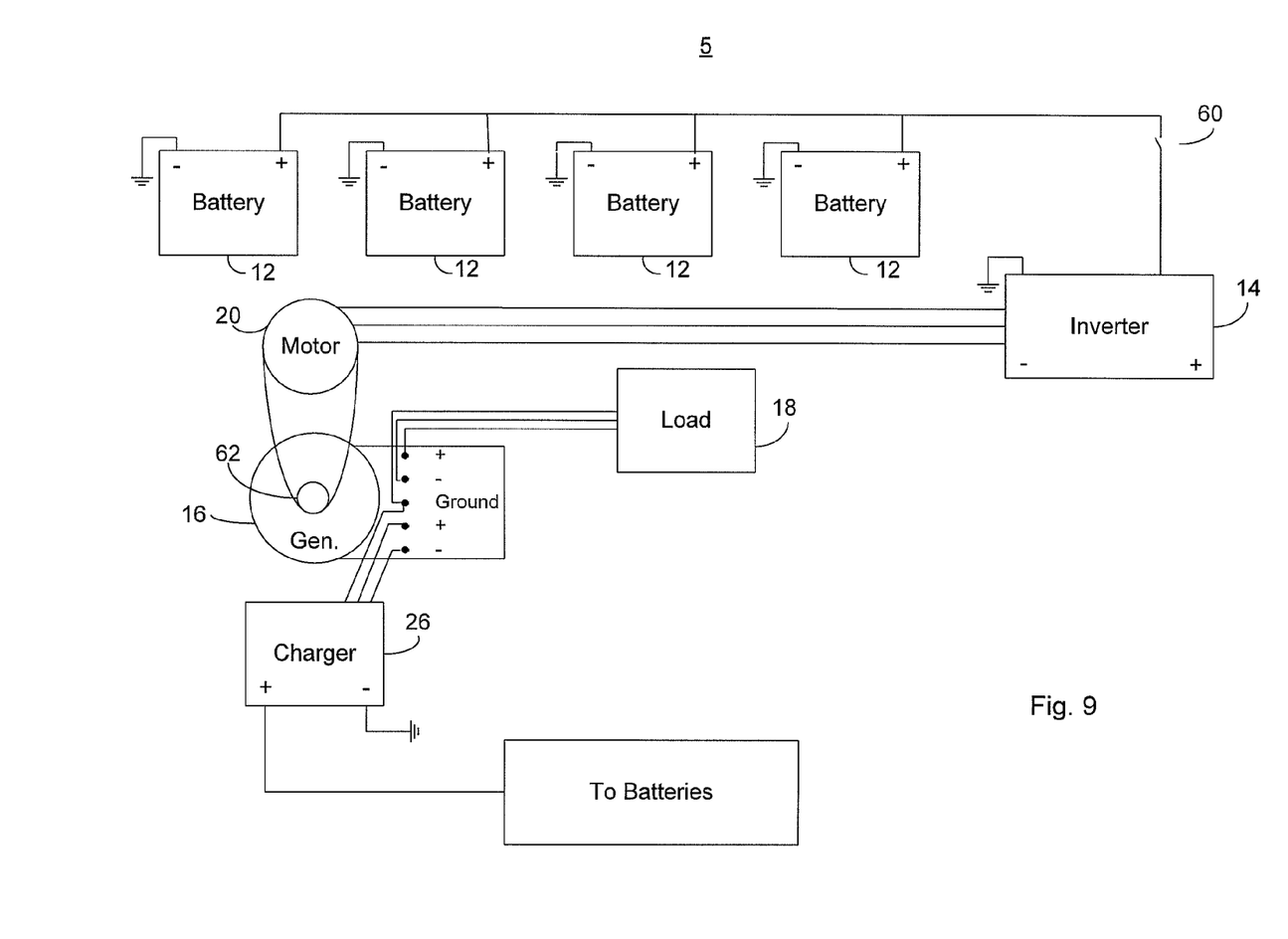
FIG. 9 discloses diagram of a self-generating electrical power system capable of sustaining a load.

FIG. 9 discloses a diagram of an electrical power system capable of sustaining a load. As illustrated, a switch device 60 is further illustrated for switching on and off when a battery 12 is within the system 5. Also illustrated is the generator 16 having an inertia weight 62. The motor 20 may drive a sheave to belt driven inertia weight. In an exemplary embodiment, the generator 16 may produce 120 volts on two legs, equaling 240 volts.

Figure 10:
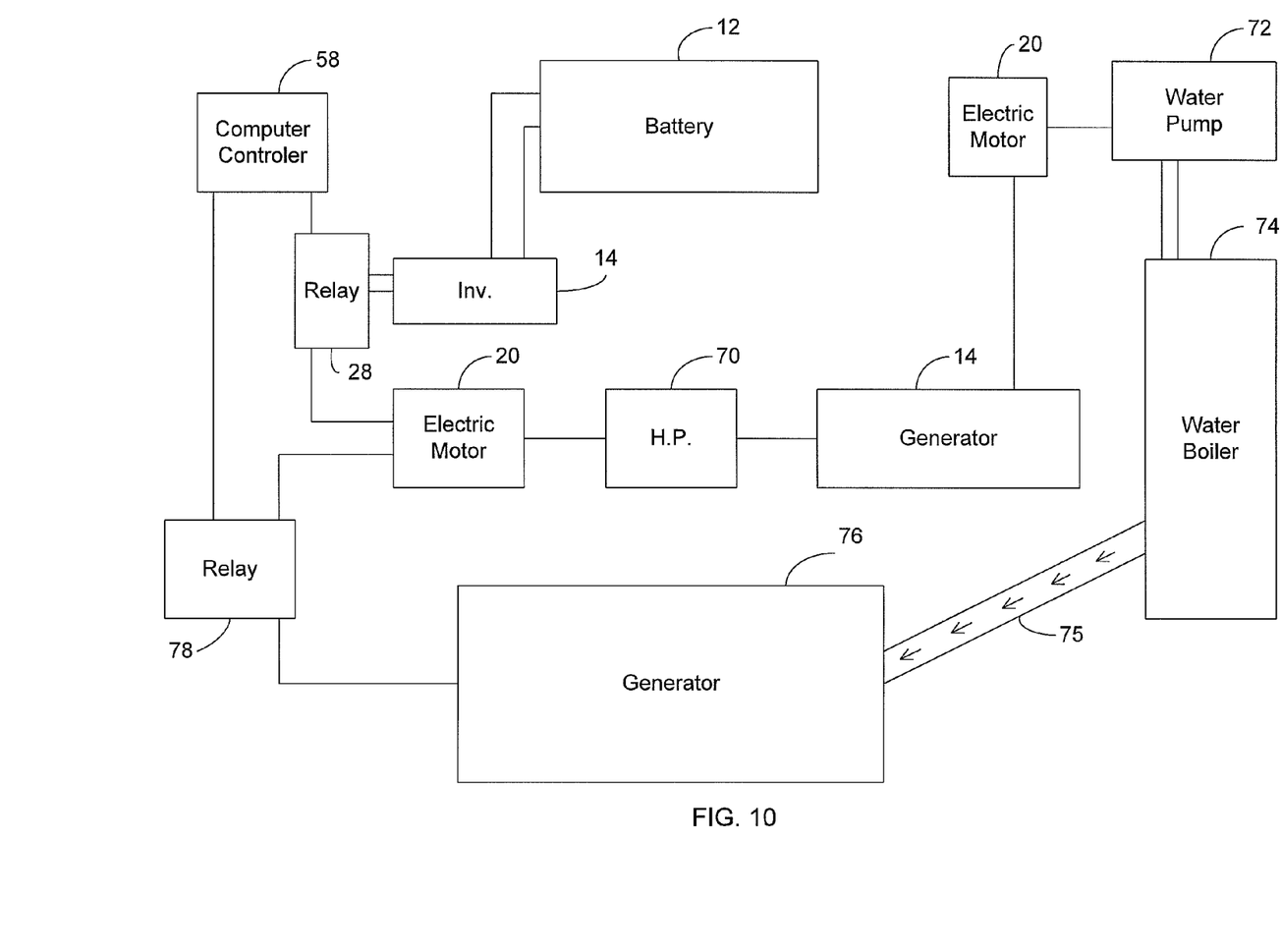
FIG. 10 discloses a diagram of the generating electrical power system used in an electric power plant and/or a desalination water plant.

FIG. 10 discloses a diagram of the generating electrical power system disclosed above used in an electric power plant and/or a desalination water plant. As illustrated, battery pack 10 provides power, via the inverter 14, to the electric motor 20. The motor spins a hydraulic pump 70, which in turn spins the generator 16 to create electricity that powers an electric water pump 72, via another electric motor 20. The water pump is connected to a water boiler 74 that produces steam 75 which power a steam generator 76. The steam generator provides power to the first electric motor 20, which results in a creation of sustainable clean energy. Also illustrated is a processor 58 or computer controller. Also illustrated are relays 78 or switching devices controllable by the processor 58. The relay is configured to shut down the system when the operational condition of the rechargeable battery 12, charger 26, electric motor 20, and/or generator 16 is at an unacceptable condition.

Though batteries are disclosed, they may be replaced with solar panels, wind turbines, and/or a conventional combustion engine generator to start to process of providing electricity to the system 5. Depending on the intended use of the system 5, the various components may be configured to power the main electric motor 20 for different environments, or configured based on specifications of the various elements.

Figure 11:
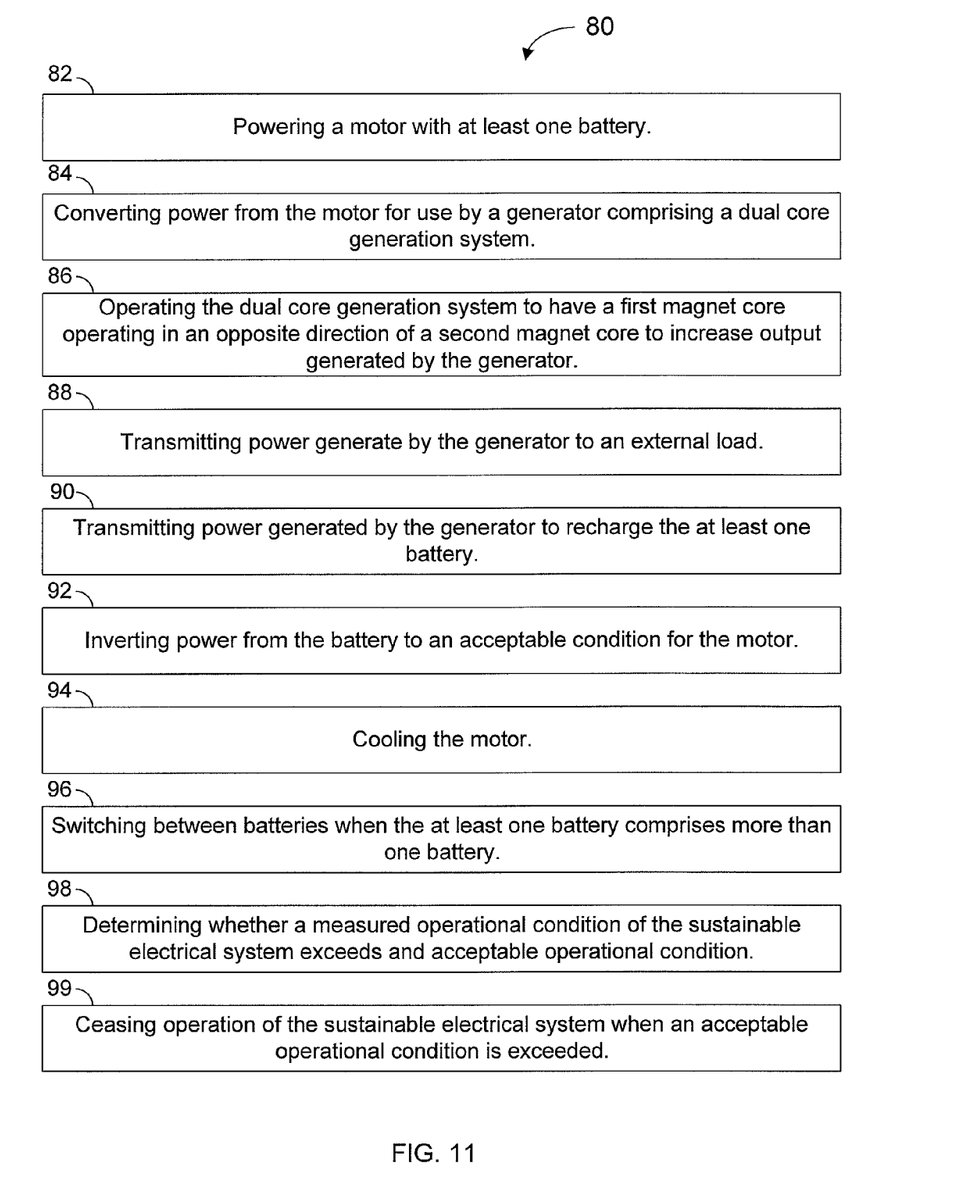
FIG. 11 discloses a flowchart illustrating an exemplary method for sustaining an electrical load with a sustainable electrical system.

FIG. 11 discloses a flowchart illustrating an exemplary method for sustaining an electrical load with a sustainable electrical system. The method 80 comprises powering a motor with at least one battery, at 82, converting power from the motor for use by a generator comprising a dual core generation system, at 84, operating the dual core generation system to have a first magnet core operating in an opposite direction of a second magnet core to increase output generated by the generator, at 86, transmitting power generated by the generator to an external load, at 88, and transmitting power generated by the generator to recharge the at least one battery, at 90. The method 80 further comprises inverting power from the battery to an acceptable condition for the motor, at 92, cooling the motor, at 94, switching between batteries when the at least one battery comprises more than one battery, at 96, determining whether a measured operational condition of the sustainable electrical system exceeds an acceptable operational condition, at 98, and ceasing operation of the sustainable electrical system when an acceptable operational condition is exceeded, at 99.

While the invention has been described with reference to various exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated, any use of the terms first, second, etc., does not denote any order or importance, but rather the terms first, second, etc., are used to distinguish one element from another.

What is claimed is:

1. An electrical power system capable of sustaining an electrical load, the system comprising:
    at least one rechargeable battery;
    a charger configured to recharge the at least one rechargeable battery;
    a single electric motor configured to receive electrical power from the at least one rechargeable battery to operate the electric motor;
    a generator configured to provide power for use by an external load and to the charger, the generator further comprising a dual core generation system comprising:
        first magnet core configured with a first rotor and a first stator, and
        a second magnet core configured with a second rotor and a second stator,
        wherein the first magnet core is housed within the second magnet core, and
        wherein the first rotor of the first magnet core is configured to operate in at least one of a same rotational direction and an opposite rotational direction of the second magnet rotor of the second magnet core as rotation of both the first magnet core and second magnet core is provided by the electric motor; and
    a torque conversion system configured to connect the electric motor and the generator for rotating the first magnet rotor and the second magnet rotor in the generator with a single shaft between the motor and generator at a rate in agreement with a rotation of the motor.

2. The system according to claim 1, further comprising an inverter to condition electrical power from the at least one rechargeable battery for use by the electric motor.

3. The system according to claim 1, wherein the at least one rechargeable battery comprises a plurality of batteries and further comprising a switching device to switch between which batteries are being discharged and recharged.

4. The system according to claim 1, further comprising a cooling system to maintain the electric motor at an acceptable operating temperature.

5. The system according to claim 1, further comprising a processor configured to determine whether an operational condition of the at least one rechargeable battery, charger, electric motor and/or generator.

6. The system according to claim 5, further comprising a sensor configured to determine the operational condition of the at least one rechargeable battery, charger, electric motor and/or generator.

7. The system according to claim 5, further comprising a relay configured to shut down the system when the operational condition of the at least one rechargeable battery, charger, electric motor and/or generator is at an unacceptable condition.

8. The system according to claim 1, wherein the torque conversion system comprises a transmission gear box and/or chain drive which turns an inertia, torque, wheel, and/or weight.

9. The system according to claim 1, wherein the at least one rechargeable battery is further configured to provide a boost in power when a peak performance is required for the external load and/or the system.

10. The system according to claim 1, further comprising a water pump, a water boiler, and a steam generator, wherein the water pump is configured to receive power from the generator, the water pump provides power to create steam within a water boiler, the steam powers the steam generator, and the steam generator provides power to the electric motor.

11. The system according to claim 10, wherein the power provided to the electric motor provides for a creation of sustainable clean energy.

12. The system according to claim 1, further comprising a grounding plate configured to provide a grounding source when the system is transportable.

13. A method for sustaining an electrical load with a sustainable electrical system, the method comprising:
    powering a motor with at least one battery;
    converting power from the motor for use by a generator comprising a dual core generation system with a first magnet core comprising a first magnet rotor and a first stator and a second magnet core comprising a second magnet rotor and a second stator with the first magnet core located within the second magnet core;
    operating the dual core generation system to have the first magnet rotor of the first magnet core operating in at least one of a same and an opposite rotational direction of the second magnet rotor of the second magnet core to increase output generated by the generator, wherein the motor operates both the first magnet core and second magnet core;

transmitting power generated by the generator to an external load; and transmitting power generated by the generator to recharge the at least one battery.

14. The method according to claim 13, further comprising inverting power from the at least one battery to an acceptable condition for the motor.

15. The method according to claim 13, further comprising cooling the motor.

16. The method according to claim 13, further comprising switching between batteries when the at least one battery comprises more than one battery.

17. The method according to claim 13, further comprising determining whether a measured operational condition of the sustainable electrical system exceeds an acceptable operational condition.

18. The method according to claim 17, further comprising ceasing operation of the sustainable electrical system when an acceptable operational condition is exceeded.

19. An electrical power system capable of sustaining an electrical load, the system comprising a generator configured to provide power, the generator further comprising a dual core generation system with a first core comprising a first magnet rotor and first stator and a second core comprising second magnet rotor and second stator with the first core located within the second core, wherein the first magnet rotor is configured to operate in one of an opposite rotational direction and a same rotational direction of the second magnet rotor as operation of both the first magnet core and second magnet core are controlled by a single electric motor through a single shaft.

20. The system according to claim 19, further comprising a grounding plate configured to connect a first stator of the first magnet core in series with a second stator of the second magnet core.

* * * * *